(12) United States Patent
Creusen et al.

(10) Patent No.: US 11,499,680 B2
(45) Date of Patent: Nov. 15, 2022

(54) SERVICING A LUMINAIRE WITH AN UNMANNED VEHICLE

(71) Applicant: SIGNIFY HOLDING B.V., Eindhoven (NL)

(72) Inventors: Martinus Petrus Creusen, Wijlre (NL); Willem Lubertus Ijzerman, Oss (NL); Lucas Leo Desire Van Der Poel, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 288 days.

(21) Appl. No.: 16/483,064

(22) PCT Filed: Feb. 1, 2018

(86) PCT No.: PCT/EP2018/052508
§ 371 (c)(1),
(2) Date: Aug. 2, 2019

(87) PCT Pub. No.: WO2018/141843
PCT Pub. Date: Aug. 9, 2018

(65) Prior Publication Data
US 2020/0011487 A1 Jan. 9, 2020

(30) Foreign Application Priority Data
Feb. 3, 2017 (EP) ..................... 17154529

(51) Int. Cl.
*F21K 9/20* (2016.01)
*B64C 39/02* (2006.01)
(Continued)

(52) U.S. Cl.
CPC .............. *F21K 9/20* (2016.08); *B64C 39/024* (2013.01); *F21S 8/08* (2013.01); *F21V 17/105* (2013.01);
(Continued)

(58) Field of Classification Search
CPC . F21K 9/20; F21K 9/00; B64C 39/024; B64C 2201/027; B64C 2201/128;
(Continued)

(56) References Cited

U.S. PATENT DOCUMENTS

| | | |
|---|---|---|
| 8,899,903 B1 | 12/2014 | Saad et al. |
| 9,056,676 B1 | 6/2015 | Wang |
| 9,387,928 B1 | 7/2016 | Gentry et al. |
| 9,454,154 B1 | 9/2016 | Safarik |

(Continued)

FOREIGN PATENT DOCUMENTS

| | | |
|---|---|---|
| JP | H05310195 A | 11/1993 |
| JP | H0781699 A | 3/1995 |

(Continued)

*Primary Examiner* — Bao Q Truong
(74) *Attorney, Agent, or Firm* — Daniel J. Piotrowski

(57) ABSTRACT

A base unit (1), e.g. a luminaire, comprises fixation means (3, 5, 15) configured to fixate a module (11), e.g. a light module, in the base unit. The fixation means, e.g. comprising one or more protrusions (15), one or more recesses (3) and one or more magnetic field generators (5), is configured to release the module from the base unit upon detecting an unmanned aircraft (31) being docked with the base unit or the module.

12 Claims, 16 Drawing Sheets

(51) Int. Cl.
    *F21S 8/08*      (2006.01)
    *F21V 23/00*     (2015.01)
    *F21V 17/10*     (2006.01)
    *F21W 131/103*   (2006.01)
    *F21V 21/096*    (2006.01)

(52) U.S. Cl.
    CPC ...... *F21V 23/003* (2013.01); *B64C 2201/027* (2013.01); *B64C 2201/128* (2013.01); *F21V 21/096* (2013.01); *F21W 2131/103* (2013.01)

(58) Field of Classification Search
    CPC .... B64C 39/02; F21S 8/08; F21S 8/00; F21V 23/003; F21V 23/00; F21V 21/096; F21V 21/0965; F21V 17/10; F21V 17/105; F21W 2131/103
    See application file for complete search history.

(56) References Cited

U.S. PATENT DOCUMENTS

| | | |
|---|---|---|
| 10,370,122 B2 * | 8/2019 | Fisher .................... B60L 53/51 |
| 2012/0152654 A1 | 6/2012 | Marcus |
| 2012/0262708 A1 | 10/2012 | Connolly |
| 2015/0035437 A1 | 2/2015 | Panopoulos |
| 2015/0158599 A1 | 6/2015 | Sisko |
| 2015/0175276 A1 | 6/2015 | Koster |
| 2016/0200438 A1 | 4/2016 | Bokeno et al. |
| 2016/0270148 A1 | 9/2016 | Filipovic et al. |
| 2016/0309346 A1 | 10/2016 | Pries |

FOREIGN PATENT DOCUMENTS

| | | |
|---|---|---|
| WO | 2016004914 A1 | 1/2016 |
| WO | 2016022646 A1 | 2/2016 |
| WO | 2016115574 A1 | 7/2016 |

* cited by examiner

SERVICING A LUMINAIRE WITH AN UNMANNED VEHICLE

CROSS-REFERENCE TO PRIOR APPLICATIONS

This application is the U.S. National Phase application under 35 U.S.C. § 371 of International Application No. PCT/EP2018/052508, filed on Feb. 1, 2018, which claims the benefit of European Patent Application No. 17154529.6, filed on Feb. 3, 2017. These applications are hereby incorporated by reference herein.

FIELD OF THE INVENTION

The invention relates to a base unit, e.g. a luminaire, and a module for installation into the base unit, e.g. a light module.

The invention further relates to an unmanned vehicle, e.g. an unmanned aircraft, for servicing a base unit, in particular a luminaire.

BACKGROUND OF THE INVENTION

Electronic devices generally experience failures sooner or later and therefore need to be serviced (e.g. repaired or replaced). When electronic devices are located at difficult to reach positions, they are challenging to service. Instead of having service personnel use a lifting ramp to reach the electronic devices, the use of an unmanned aircraft to service electronic devices at difficult to reach positions is gaining in popularity.

US2015/0035437A1 discloses drone maintenance techniques with which a drone can send a control signal to disconnect power couplings and later to connect them, and to electromechanically and/or electromagnetically, or magnetically attach itself to remove and reinstall lighting luminaires to disconnect them from light poles or towers or as such devices might be attached to or in buildings where a drone can lift and replace a luminaire for maintenance with automatically unlocking and locking mechanisms and automatically locking and unlocking power couplings. A drawback of the above-mentioned techniques of disclosed in US2015/0035437A1 is that the drone needs to replace the entire luminaire, which requires the drone to be large and powerful.

WO 2016/115574 A1 discloses personal Unmanned Aerial Vehicles (UAV's) and UAV universal docking ports to be incorporated into and/or attached to for example apparel, UAV's or poles such as street lamp posts, referred to collectively as docking stations. A docking station may have one or more docking ports for docking, networking and charging or refueling UAVs. An UAV may incorporate a universal docking port that serves as a standard physical docking, communications and power charging connector between two or more docked UAV's, between a UAV and a docking station and/or between multiple UAV's and a docking station. Two or more UAV's with one or more docking ports may dock with each other in flight creating a connected UAV group. A UAV group may fly, dock, undock and operate as a collective and perform task as single operating unit.

SUMMARY OF THE INVENTION

It is a first object of the invention to provide a base unit, which allows an electronic device at a difficult to reach position and comprising such base unit, e.g. a luminaire, to be serviced with a relatively simple unmanned aircraft.

It is a second object of the invention to provide a module, which allows an electronic device at a difficult to reach position and comprising such module, e.g. a luminaire, to be serviced with a relatively simple unmanned aircraft.

It is a third object of the invention to provide an unmanned aircraft, which is capable of servicing an electronic device at a difficult to reach position, e.g. a luminaire, and which is relatively simple.

In a first aspect, a base unit comprises fixation means configured to fixate a module in said base unit, said fixation means being configured to release said module from said base unit upon detecting an unmanned aircraft being docked with said base unit or said module, e.g. by detecting a short-range wireless signal or physical contact using a docking detector.

The inventors have recognized that by separating an electronic device, e.g. a luminaire, in a base unit that does not need to be serviced or only rarely needs to be serviced and one or more modules that can be removed from the base unit in order to replace or repair them, an unmanned aircraft that is relatively simple can be used to service the electronic devices. The base unit may therefore be the stationary part of the electronic device and the one or more modules may be the removable part of the electronic device. The base unit and the one or more modules, when fixed in the base unit, are configured to operate as one single electronic device.

In order to make sure that the module does not shift position relative to the base unit or fall out of the base unit, one or more of modules are fixated in the base unit and only released upon detecting that the unmanned aircraft is docked with the base unit or the module. This may be detected by a docking detector in the base unit or in one of the modules or by the unmanned aircraft itself. Preferably, the fixation means comprises at least one magnetic field generator so that the unmanned aircraft, the base unit and the one or more modules may not need to use extraordinary mechanical force. The base unit is preferably part of a luminaire. However, the disclosed concept is also applicable to other electronic devices positioned at difficult to reach positions, e.g. devices comprising a camera and/or other sensors (e.g. temperature, light, air quality).

Said base unit may comprise at least one of a protrusion and a recess. This allows a mechanical fixation of the module in the base unit. If the base unit has a protrusion, then the module preferably has a recess at a corresponding position. If the base unit has a recess, then the module preferably has a protrusion at a corresponding position. The protrusion may additionally or alternatively be used to transfer power from the base unit to the module, for example.

Said protrusion may generate a magnetic field or comprise metallic material attracted by a magnetic field. This allows the protrusion to be forced into the recess. The metallic material attracted by a magnetic field may comprise iron, for example. An alternative would be to use a mechanical force instead of a magnetic force to force the protrusion into the recess, but this makes the unmanned aircraft more complex.

Said fixation means may comprise magnetic field generating means configured to fixate said module in said base unit by attracting a permanent magnet in said module. Instead of or in addition to using at least one protrusion and at least one recess, use of a continuing magnetic force to keep the module fixated in the base unit reduces the amount of moving parts that needs to be used, which are more susceptible to wear and tear. The magnetic field generating means may comprise a further permanent magnet.

Said base unit may comprise further magnetic field generating means configured to cancel a magnetic field generated by said magnetic field generating means. This allows the module to be released from the base unit. Alternatively or additionally, the further magnetic field generating means may be part of the module.

Said base unit may further comprise guiding means for guiding said module towards a certain orientation relative to said base unit. This is especially beneficial in case of asymmetrical light emission by a light module or in case contacts of the base unit and the module need to align, e.g. for electrical power transfer.

Said base unit may further comprise alignment detection means for detecting correct alignment of said module with said base unit, wherein said fixation means are configured to lock said module in said base unit in dependence on said module being correctly aligned with said base unit. This ensures that the module can be repositioned (e.g. rotated or pushed) by the unmanned aircraft as long as the base unit has not been correctly aligned with the module.

In a second aspect, a module comprises fixation means configured to fixate said module in a base unit, said fixation means being configured to release said module from said base unit upon detecting an unmanned aircraft being docked with said base unit or said module. Typically, both the base unit and the module comprise fixation means. The mechanism to release the module from the base unit may be realized in the base unit or in the module or in both the base unit and the module.

Said module may comprise at least one of a protrusion and a recess. Said protrusion may generate a magnetic field or may comprise metallic material attracted by a magnetic field.

In a third aspect, an unmanned aircraft comprises docking means configured to dock with at least one of a base unit and a module, instruction means configured to instruct said base unit and/or said module to release said module from said base unit, and collection means configured to collect said module from said base unit after said module has been released from said base unit. The collection means may comprise arms and/or a container, for example. If the base unit or module does not detect that the unmanned aircraft has docked with the base unit or module, the unmanned aircraft may detect this itself and send an appropriate instruction to the base unit and/or to the module to release the module from the base unit. Even if the docking means is only configured to dock with a module, the docking means may be separate from the collection means. For example, the unmanned aircraft may first dock with the module with the help of magnets and after the module has been released from the base unit, collect the module by using its arms.

In a fourth aspect, an unmanned vehicle comprises an optical sensor configured to sense direct or indirect light emissions from a luminaire. The above-mentioned unmanned aircraft or another unmanned vehicle (e.g. car) may be used to determine whether a luminaire needs to be serviced before the luminaire is actually serviced. For this purpose, it may be equipped with an optical sensor.

The optical sensor may comprise an IR camera configured to sense heat emitted by said luminaire. Heat provides a good indication whether a component of the luminaire, e.g. a driver or LED chip, has failed or is about to fail. By comparing the heat emitted by the different components of the luminaire and/or module(s) for irregularities, it is not necessary to fly very close to the luminaire in order to determine the actual/absolute heat of the individual components.

The optical sensor may be configured to measure a light distribution of light emitted by said luminaire. The optical sensor may comprise a spectrometer, for example. In this way, the unmanned vehicle may be used to help determine whether the requirements for light distribution are being met. The measured light distribution may be used to configure the luminaire or an electrical component of the luminaire, e.g. a driver of the luminaire. For example, the driver can be set at the right current (for the light source or light sources) by a direct feedback loop between unmanned vehicle and luminaire. The unmanned vehicle may transmit configuration information to the luminaire or may transmit data representing the measured light distribution to the luminaire so that the luminaire may determine configuration information from this data. The unmanned vehicle may transmit this configuration information or data wirelessly to the luminaire.

The unmanned vehicle may further comprise position determining means configured to determine a position of said unmanned vehicle at the moment of sensing said emissions from said luminaire. The determined position may only comprise a height, for example. Alternatively, the determined position may comprise GPS coordinates. When the unmanned vehicle is able to fly at different heights, the height at which the emissions were sensed needs to be taken into account in order to check whether the desired light distribution is achieved. The analysis of the light emissions and the determined position may be performed inside or outside the unmanned vehicle. As an example of the latter, the unmanned vehicle may transmit data representing the light emissions and the determined position to a central location via cellular communication.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
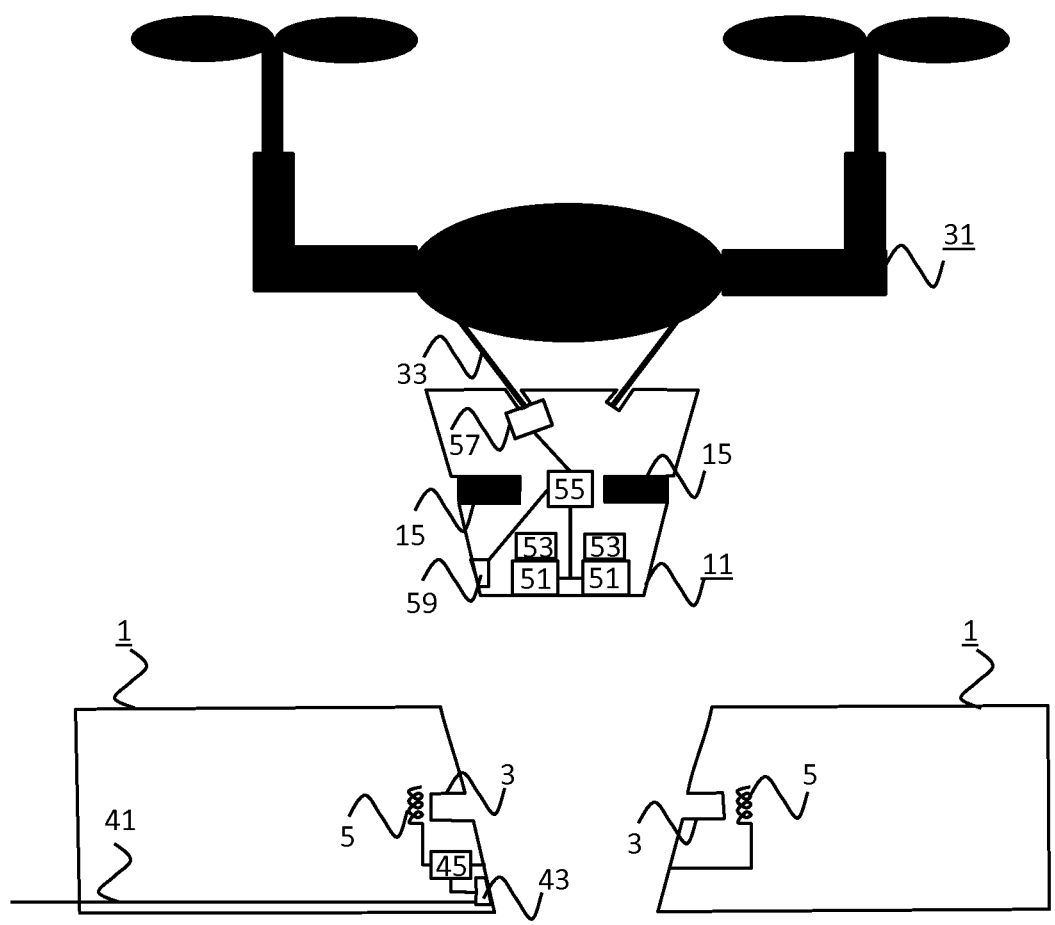
FIG. 1 is a block diagram of a first embodiment of the base unit and the module of the invention.
Figure 3:
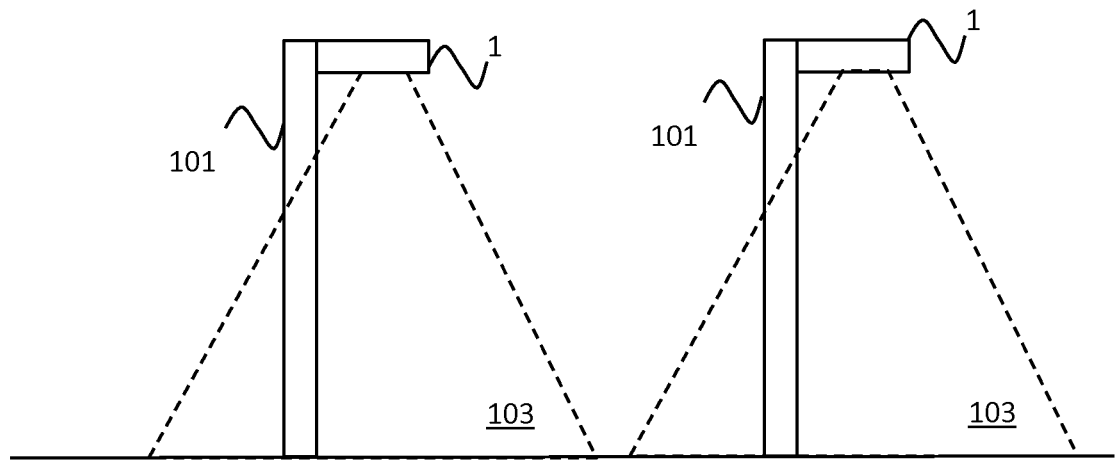
FIG. 3 illustrates lamp posts comprising the base unit and module of FIG. 1.

FIG. 1 shows embodiments of a base unit, a module and an unmanned aircraft: a luminaire 1, a light module 11 and a drone 31, respectively. The light module 11 comprises two light sources 51, e.g. LED chips, and two heat sinks 53 for cooling the light sources 51. The luminaire 1 may be mounted on a lamp post 101, as shown in FIG. 3. When a light module 11 is fixed in the luminaire 1 and the luminaire 1 has been activated, the luminaire 1 (i.e. the light module 11 of the luminaire 1) generates light emissions 103.

As shown in FIG. 1, the drone 31 is approaching the luminaire 1 with the light module 11 in order to insert the light module 11 into an opening 47 of the luminaire 1. The opening 47 is tapered in the embodiment of FIG. 1 to make it easier to align the light module 11 with the luminaire 1. There is currently no light module 11 installed in the luminaire 1, e.g. because a malfunctioning light module 11 was removed earlier. The drone 31 carries the light module using arms 33. Two arms 33 are shown in FIG. 1, but less or more arms may be used in another embodiment.

Figure 4:
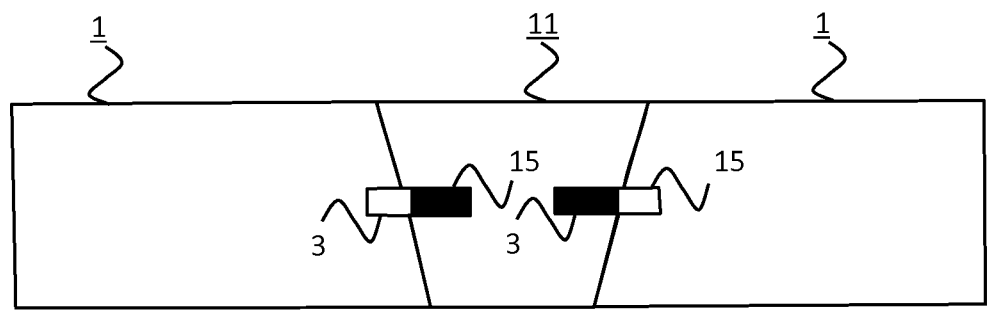
FIG. 4 illustrates the protrusions of FIG. 1 before fixation.
Figure 5:
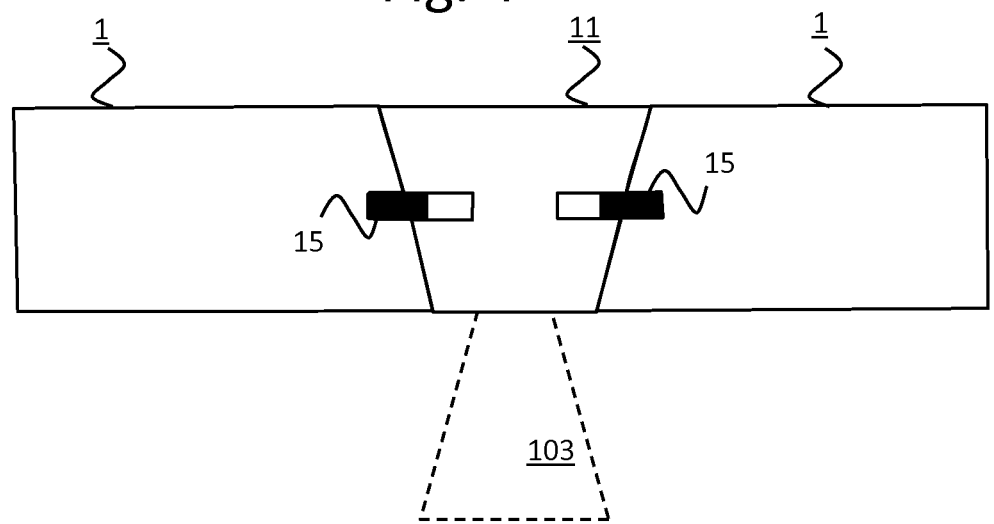
FIG. 5 illustrates the protrusions of FIG. 1 after fixation.

The light module 11 comprises two movable protrusions 15 (e.g. pins), shown in non-protruded state in FIG. 1, which are used to fixate the light module 11 in the luminaire 1. The protrusions 15 may be mounted in a shaft in which they can move from one side to the other side without being able to fall out of the shaft. FIG. 4 shows the light module 11 having been inserted into the opening 47 of the luminaire 1, but not yet being fixated in the luminaire 1. FIG. 5 shows the light module 11 being fixated in the luminaire 1. In FIG. 5, the protrusions 15 of the light module 11 protrude the light module 11 and have entered the recesses 3 of the luminaire 1, which are shown in FIG. 4. After the light module 11 has been fixated in the luminaire 1 and the luminaire 1 has been activated, the light module 11 generates light emissions 103.

When the light module 11 has been inserted into the opening 47 of the luminaire 1, the protrusions 15 are moved with the help of a magnetic field, e.g. using techniques similar to those used in Electronic Article Surveillance (EAS) security tags. In the embodiment of FIG. 1, the protrusions 15 each comprise a permanent magnet. The magnetic field is generated by two magnetic field generators 5. The magnetic field generators 5 are represented with a graphic depicting a coil in FIG. 1, but the magnetic field generators may comprise other components than just a coil or may not even comprise a coil. The magnetic field generators 5 are powered by a power cable 41, e.g. a 230V 15 A AC power cable. The magnetic field generators 5 use the electric currents provided over the power cable to generate a magnetic field.

When the light module 11 needs to be released from the luminaire 1, the magnetic field generators 5 each generate a magnetic field with the same polarity as the polarity of the permanent magnets of the protrusions 15 in order to repel the protrusions 15 and force them in a non-protruded state. When the light module 11 needs to be locked in the luminaire 1, the magnetic field generators 5 each generate a magnetic field with a polarity opposite to the polarity of the permanent magnets of the protrusions 15 in order to attract the protrusions 15 and force them in a protruded state into the recesses 3.

The light module 11 is powered by the luminaire 1. In the embodiment of FIG. 1, the light module 11 comprise a driver 55. In another embodiment, the driver 55 may be part of the luminaire 1 or of another module. In the embodiment of FIG. 1, 230V power is provided to the (driver 55 of) the light module 11 via electrical contacts 43 and 59. This requires a precise alignment between the light module 11 and the luminaire 1.

The driver 55 in the light module 11 converts power received from the power cable 41 via the electrical contacts 43 and 59 to a power suitable for the light sources 51. The light sources 51 may be LED chips and the driver 55 may be a LED driver that provides a constant quality of power to the LED chips, for example. The converted power output by the driver 55 may be 5V and 500 mA, for example. In an alternative embodiment, the power may be provided to the luminaire 11 wirelessly, e.g. using a wireless power transmitter in the luminaire 1 and a wireless power receiver in the light module 11. The light sources 51 may comprise optics, e.g. a lens and/or a reflector. In another embodiment, optics may additionally or alternatively be part of the base unit and/or another module.

In the embodiment of FIG. 1, the light module 11 is only locked in the luminaire 1 when the light module 11 is correctly aligned with the luminaire 1. A control circuit 45 forms alignment detection means together with electrical contacts 43 and 59. Only when the electrical contacts 43 and 59 are in contact will the control circuit 45 consider the light module 11 to be correctly aligned with the luminaire 1 and ready to be released from the drone 31. The magnetic field generators 5 start attracting the protrusions 15 upon detecting correct alignment. The attracting may stop after a predetermined period of time or when it is detected that the protrusions are sufficiently protruded. A docking detector 57 is present in the light module 11 to detect whether drone 31 has docked with the light module 11. The docking detector 57 may comprise a touch detector or a Reed contact, for example. If the docking detector 57 is an actively powered device, it may be powered by the driver 55 in case the light module 11 is powered by the luminaire 1 or it may be additionally or alternatively have its own power controller/regulator or may be powered by a battery, for example, in case the light module 11 it is not (yet) powered by the luminaire 1.

When the light module 11 is to be removed from the luminaire 1 by drone 31, upon detection of an arm 33 of the drone 31 by the docking detector 57, indicating that the drone 31 has docked, a wireless signal is transmitted to the control circuit 45 informing the control circuit 45 that the light module 11 may be released from the luminaire 1. The control circuit 45 thereby acts as a docking detector of the luminaire 1. The control circuit 45 activates the magnetic field generators 5 with a polarity that is the same as the polarity of the permanent magnet of the protrusions 15 to repel the protrusions 15 in order to force them into non-protruded state. The repelling may stop after a predetermined period of time or when it is detected that the protrusions are sufficiently retracted.

Figure 2:
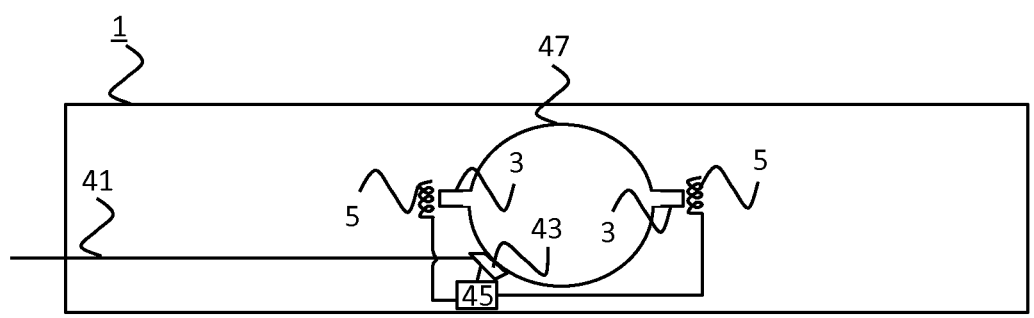
FIG. 2 is a block diagram of the base unit of FIG. 1 shown from a different perspective.

FIG. 2 shows the components of the luminaire 1 with a top perspective instead of the side perspective of FIG. 1 in order to show that the power cable 41 does not pass through the opening 47.

Figure 6:
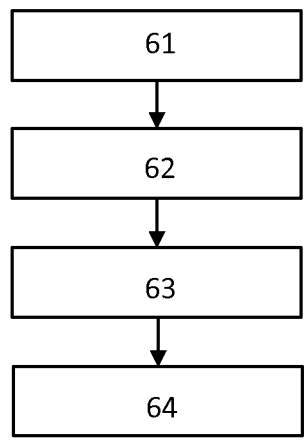
FIG. 6 is a flow diagram of the method of an unmanned aircraft collecting the module from the base unit.

FIG. 6 shows a flow diagram of a method of an unmanned aircraft collecting a module from a base unit. The unmanned aircraft may be able to find the base unit by using a camera to recognize the base unit, the module or a part thereof, possibly further using a current GPS location of the unmanned aircraft and a GPS location of the targeted base unit. After the unmanned aircraft arrives at the base unit, the unmanned aircraft attaches to the module in step 61. In step 62, the unmanned aircraft or the module signals the base unit or the module to release the module from the base unit or the module detects that the unmanned aircraft has docked with the module and releases itself from the base unit. In step 63, the unmanned aircraft waits a certain period of time or waits for a signal from the base unit or the module (indicating that the module has been released from the base unit) before departing in step 64.

Figure 7:
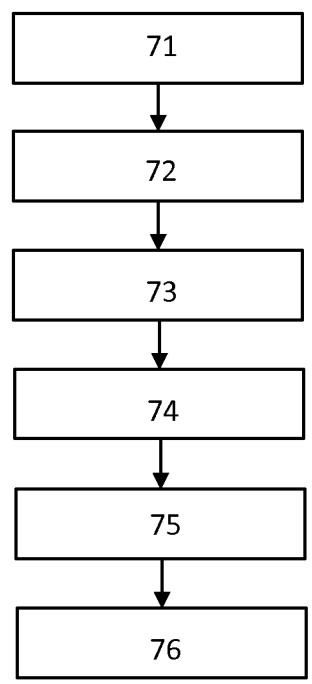
FIG. 7 is a flow diagram of the method of an unmanned aircraft installing the module in the base unit.

FIG. 7 shows a flow diagram of a method of an unmanned aircraft installing a module in a base unit. After the unmanned aircraft arrives at the base unit, the unmanned aircraft inserts, e.g. lowers, the module in the opening of the base unit in step 71. The module or base unit detects correct insertion in step 72. The module and/or base unit then fixate the module in the base unit in step 73. The module or base unit signals the unmanned aircraft that the module has been fixated in the base unit in step 74. The unmanned aircraft releases the module in step 75. The unmanned aircraft departs in step 76.

Figure 8:
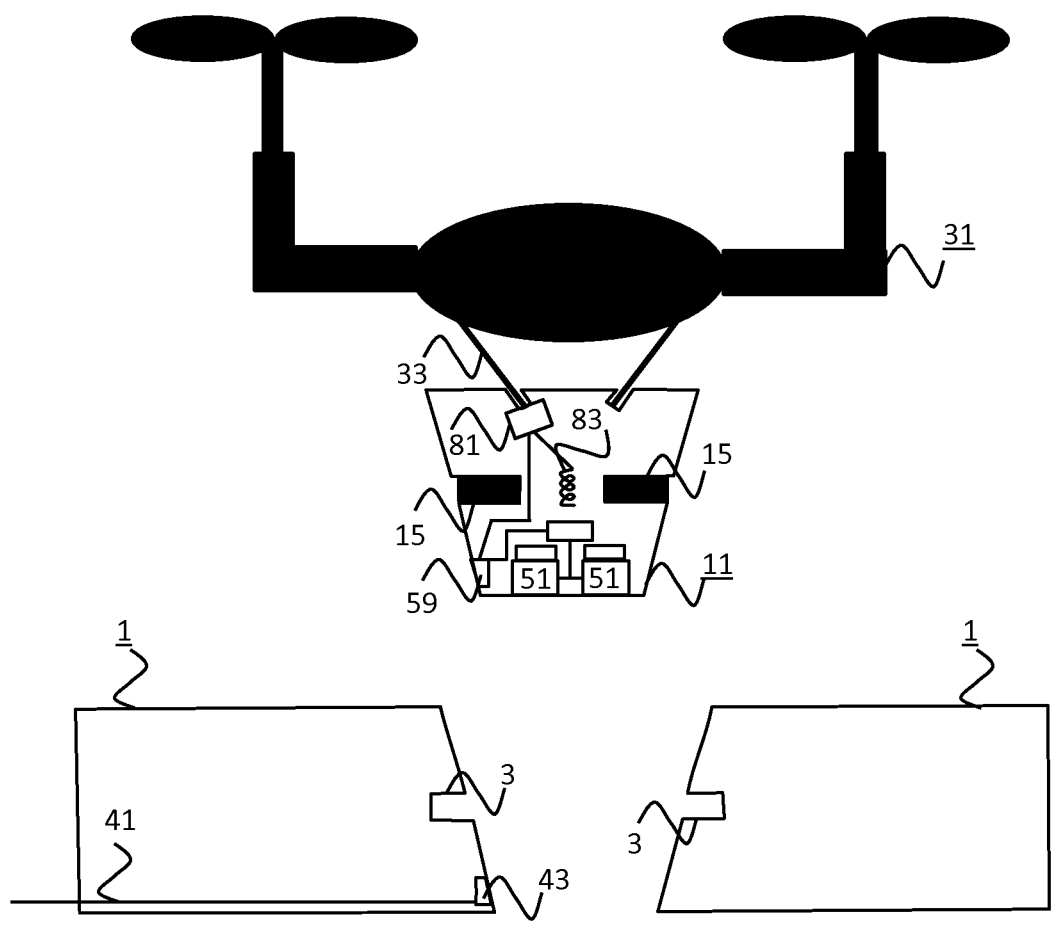
FIG. 8 is a block diagram of a second embodiment of the base unit and the module of the invention.
Figure 9:
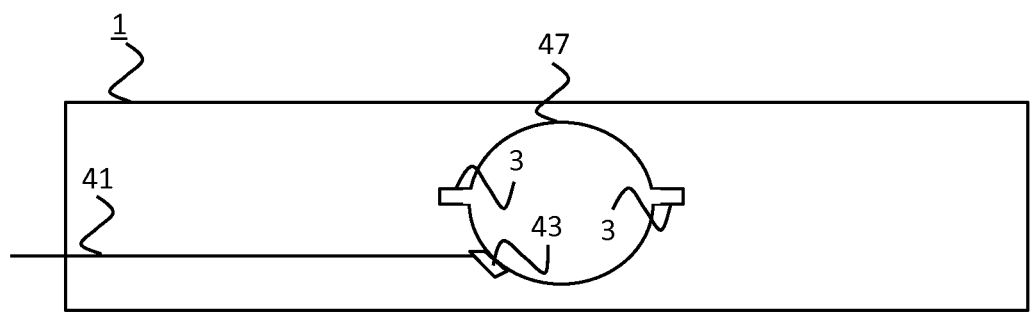
FIG. 9 is a block diagram of the base unit of FIG. 8 shown from a different perspective.

A second embodiment of the base unit and the module are shown in FIGS. 8 and 9. Compared to FIG. 1, the light module 11 of FIG. 8 comprises a magnetic field generator 83. In order to fixate the light module 11 in the luminaire 1, the magnetic field generator 83 repels the protrusions 15 into the recesses 3 of the luminaire 1 if the light module 11 receives power from the luminaire 1, which only occurs if the light module 11 and the luminaire 1 are correctly aligned. The magnetic field generator 83 is represented with a graphic depicting a coil in FIG. 8, but the magnetic field generator 83 may comprise other components than just a coil or may not even comprise a coil.

Furthermore, compared to FIG. 1, the light module 11 comprises a docking detector 81 instead of the docking detector 57. When the docking detector 81 has detected that the drone 31 has docked with the light module 11 to remove the light module 11 from the luminaire 1, the docking detector activates the magnetic field generator 83 to generate a magnetic field with a polarity opposite to the polarity of the protrusions 15 to attract the protrusions 15 in order to force them into non-protruded state.

Docking detector 81 may further be used to (re)charge the drone 31 via the arm 33. Alternatively, the drone 31 may be (re)charged in a non-galvanic way (e.g. capacitive or inductive) via the light module 11. The same power interface may also be usable to power the drone 31 and accessories connected to the drone 31 when docked (e.g. like a drone window cleaner).

FIG. 9 shows the components of the luminaire 1 of FIG. 8 with a top perspective instead of the side perspective of FIG. 8.

Figure 10:
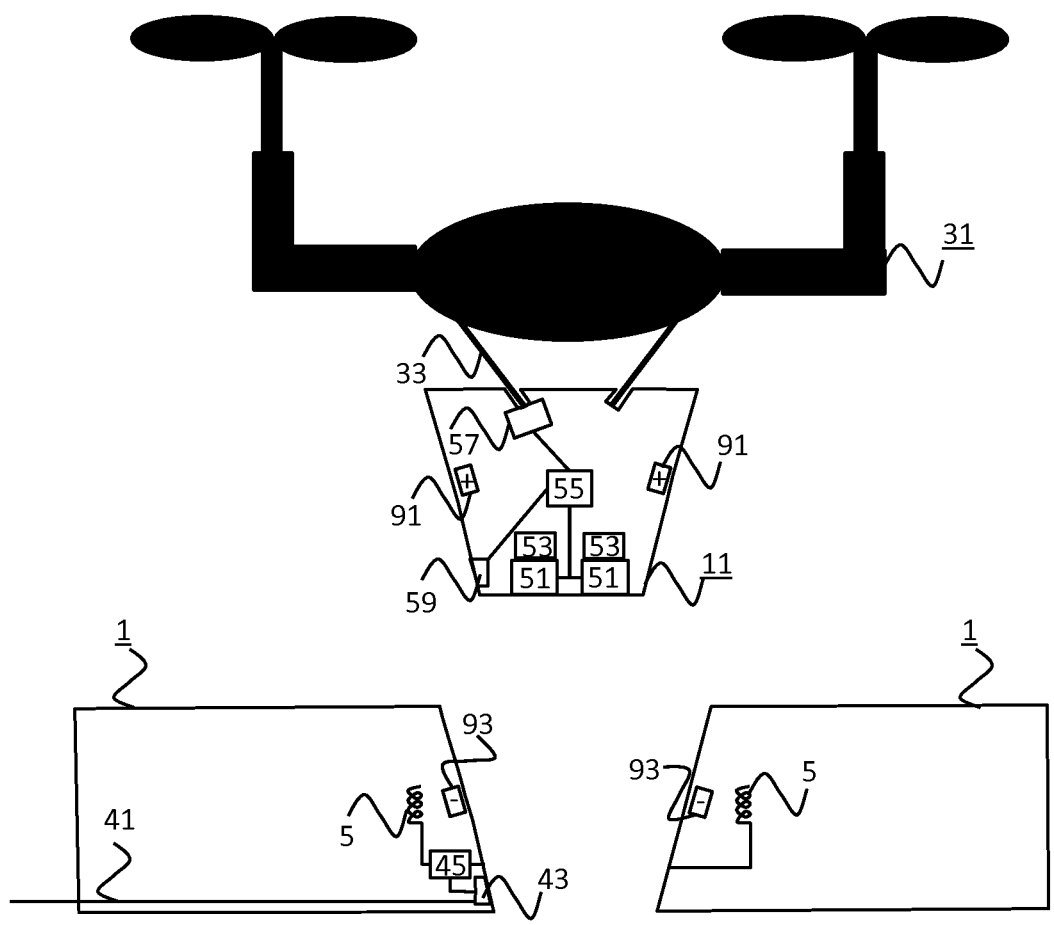
FIG. 10 is a block diagram of a third embodiment of the base unit and the module of the invention.
Figure 11:
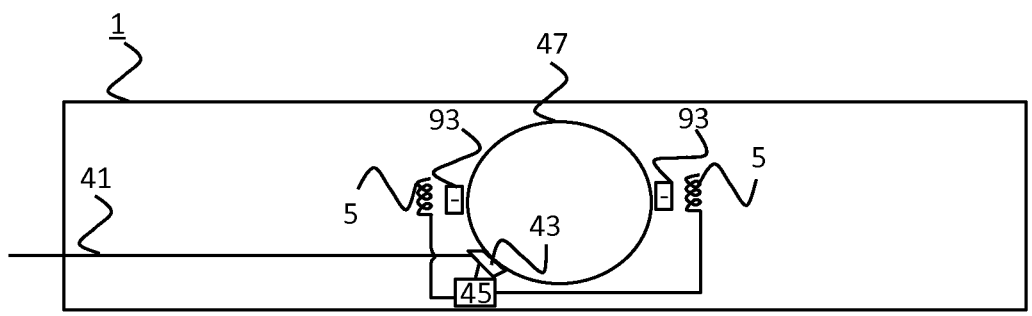
FIG. 11 is a block diagram of the base unit of FIG. 10 shown from a different perspective.

A third embodiment of the base unit and module are shown in FIGS. 10 and 11. Neither the luminaire 1 nor the light module 11 have protrusions or recesses for fixating the light module in the luminaire 1. The luminaire 1 and/or the light module 11 may have one or more protrusions and one or more recesses for guiding the light module 11 toward the correct position and orientation relative to the luminaire 1 (not shown), but not for fixating the light module 11 in the luminaire 1. The luminaire 1 comprises two permanent magnets 93 and the light module 11 comprises two permanent magnets 91. Each permanent magnet 93 of the luminaire 1 attracts a corresponding permanent magnet 91 of the light module 11.

When the drone 31 comes to collect the light module 11 and attaches to the light module 11, this is detected by docking detector 57. The docking detector 57 signals the control circuit 45, which activates the magnetic field generators 5. The activated magnetic field generators 5 cancel the magnetic fields generated by the permanent magnets 93. The control circuit 45 then informs the drone 31 that it can depart with the released light module 11.

Figure 12:
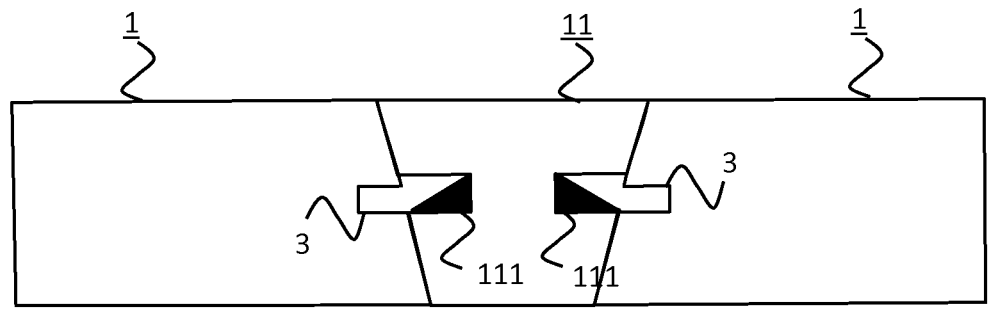
FIG. 12 illustrates alternative protrusions before fixation.
Figure 13:
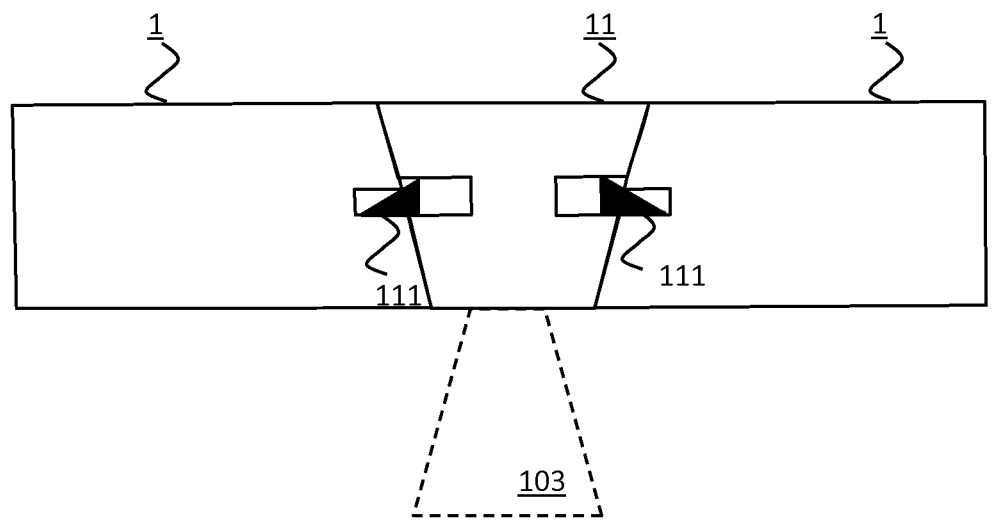
FIG. 13 illustrates the alternative protrusions of FIG. 12 after fixation.

FIGS. 12 and 13 show alternative protrusions 111. Compared to the protrusions 15 of FIG. 1, the shape of the protrusions 111 of FIGS. 12 and 13 is triangular. This ensures that the light module 11 is pushed down, as shown in FIG. 13, when the protrusions are attracted or repelled into the recesses 3, which are shown in FIG. 12. As a result, the light module 11 and the luminaire 1 are aligned more optimally.

In the embodiment of FIG. 1, the luminaire 1 comprises a single module: a light module 11. The luminaire 1 of FIG. 14 comprises two modules: a light driver module 115 and a light source module 117. In this embodiment, the two modules need to be placed on top of each other in order for the luminaire 1 to be able to emit light. In an alternative embodiment, the luminaire 1 may comprise more than two modules (e.g. it may include an additional sensor module and/or an additional radio communication module). Some or all of the modules may be placed next to each other.

Figure 14:
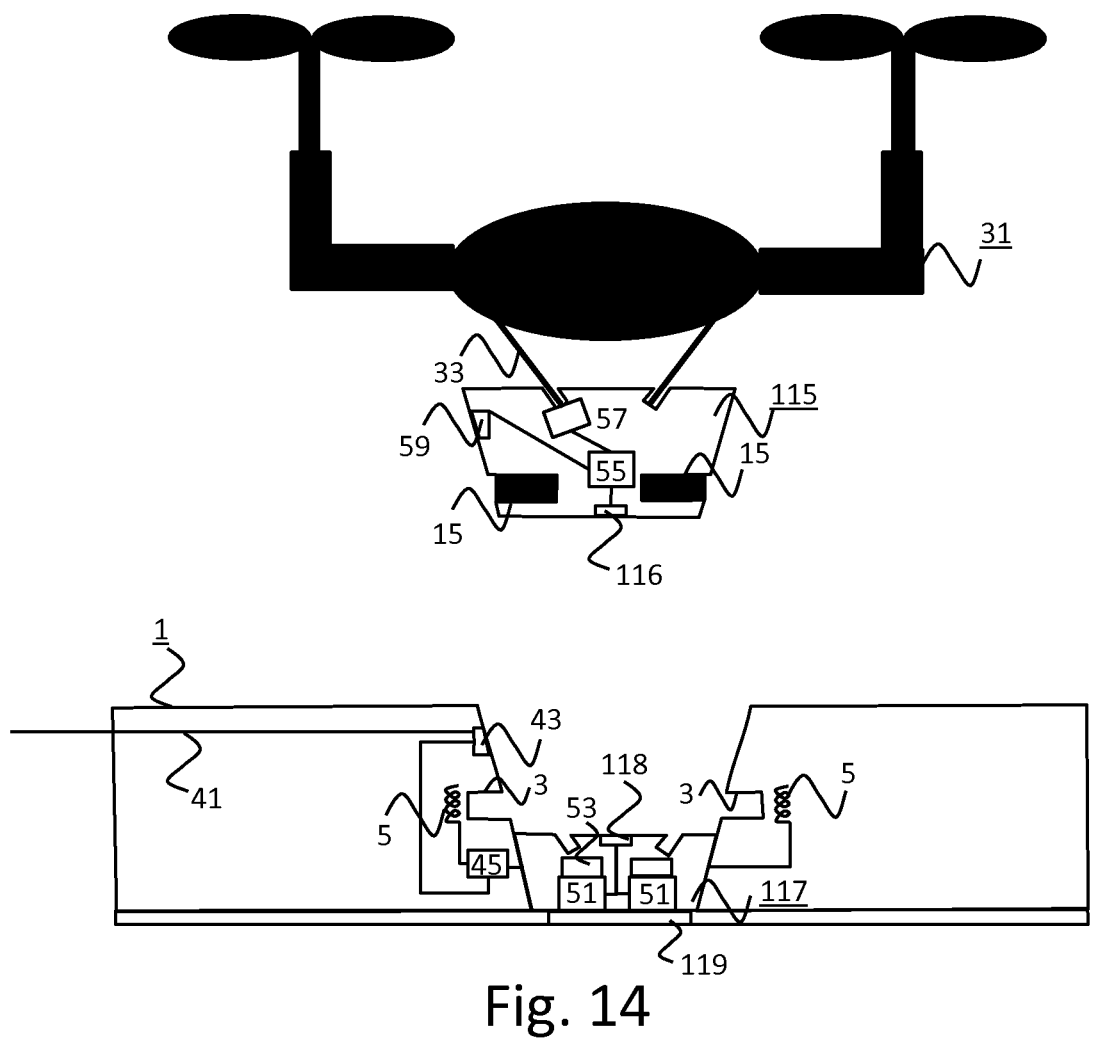
FIG. 14 is a block diagram of a fourth embodiment of the base unit and the module of the invention.

In the embodiment shown in FIG. 14, only the light driver module 115 is fixated in the luminaire. Since the light source module 117 cannot shift when the light driver module 115 has been fixated on top of it, it does not need to be fixated. In an alternative embodiment, both modules are fixated in the luminaire 1. In the embodiment of FIG. 14, the luminaire 1 comprises a separate optics part 119 that is not removable from the luminaire 1. In an alternative embodiment, this optics part 119 is part of one of the modules.

The light driver module 115 receives power from the luminaire 1 via electrical contacts 43 and 59 and provides power to the light source module 117 via electrical contacts 116 and 118. In an alternative embodiment, the two modules are attached to each other, e.g. via a Bayonet connector and mount, and/or the light driver module 115 provides power to the light source module 117 in a non-galvanic manner.

Figure 15:
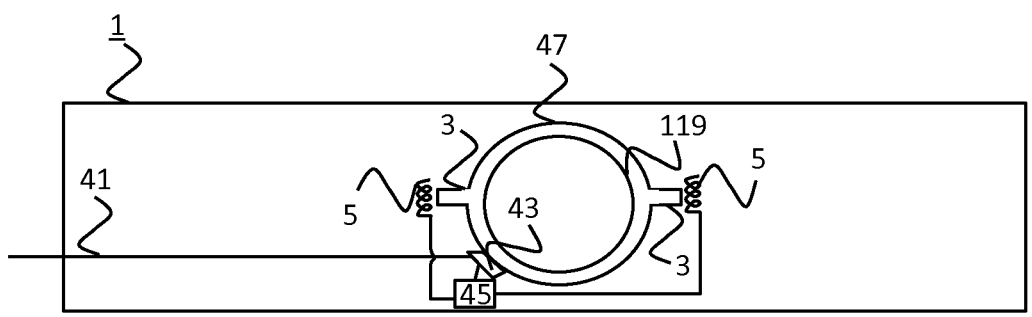
FIG. 15 is a block diagram of the base unit of FIG. 14 shown from a different perspective.

FIG. 15 shows the components of the luminaire 1 of FIG. 14 with a top perspective instead of the side perspective of FIG. 14.

Figure 16:
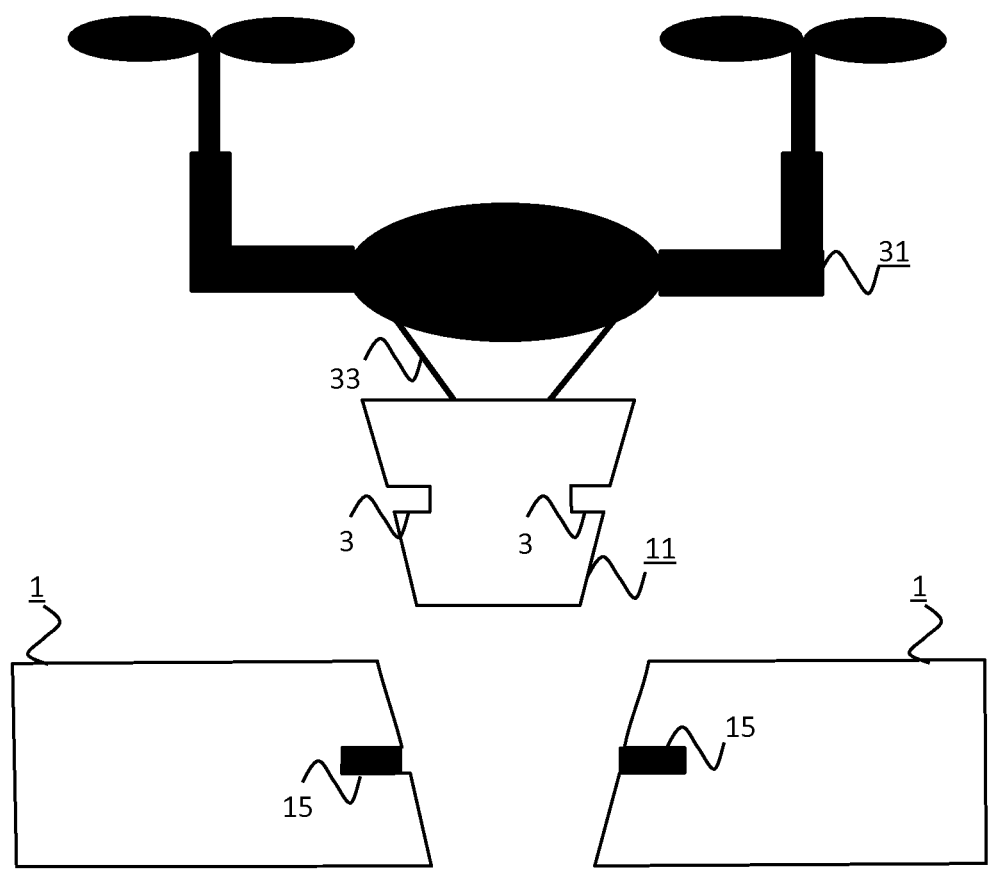
FIG. 16 is a block diagram of a fifth embodiment of the base unit and the module of the invention.

A further embodiment of the base unit and the module are shown in FIG. 16. Compared to FIG. 1, the protrusions 15 (e.g. pins) are included in the luminaire 1 instead of the light module 11 and the recesses 3 are included in the light module 11 instead of in the luminaire 1 in FIG. 16.

Figure 17:
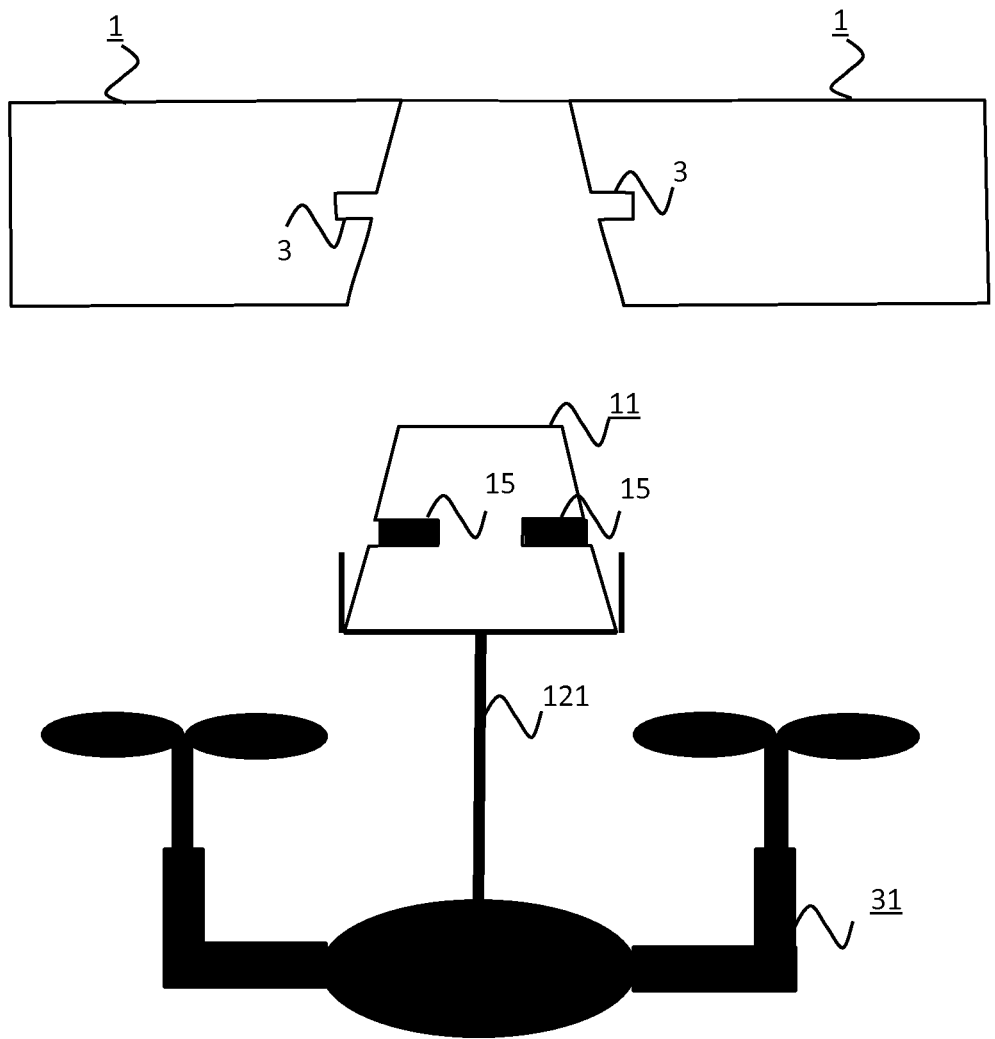
FIG. 17 is a block diagram of a sixth embodiment of the base unit and the module of the invention.

A further embodiment of the base unit and the module are shown in FIG. 17. Compared to FIG. 1, the drone 31 of FIG. 17 has a single arm 121 with a basket to carry light module 11. This allows the drone 31 to be used to install light modules in, or replace light modules of, a ceiling luminaire, which is not approachable from above.

Figure 18:
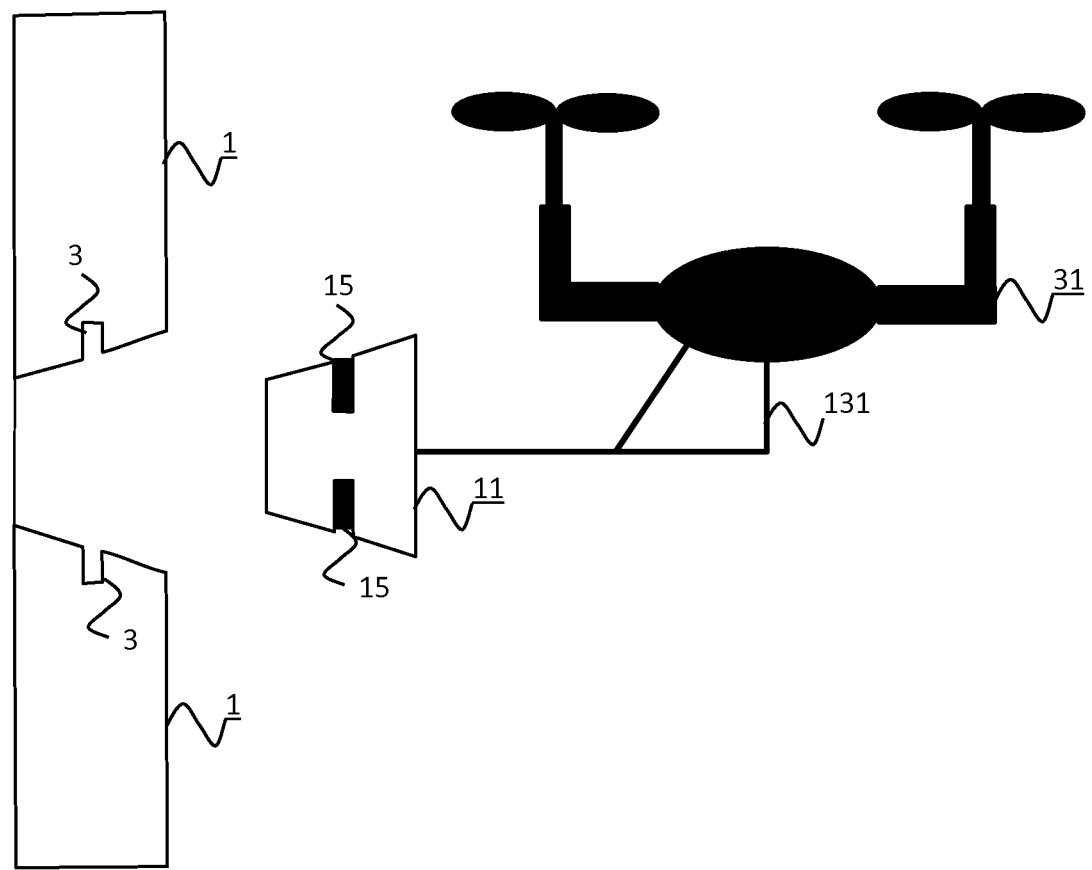
FIG. 18 is a block diagram of a seventh embodiment of the base unit and the module of the invention.

A further embodiment of the base unit and the module are shown in FIG. 18. Compared to FIG. 1, the drone 31 of FIG. 18 has a single horizontal arm 131 (supported by a short rod) to carry light module 11. This allows the drone 31 to be used to install light modules in, or replace light modules of, a wall luminaire, which is not approachable from above or below. The arm 131 may have a threaded fastener at its end and the light module 11 may have a threaded hole at the side at which no light sources are present. The drone 131 may be able to connect the threaded fastener and the threaded hole by rotating the arm in one direction and to disconnect the two components by rotating the arm in the opposite direction.

Figure 19:
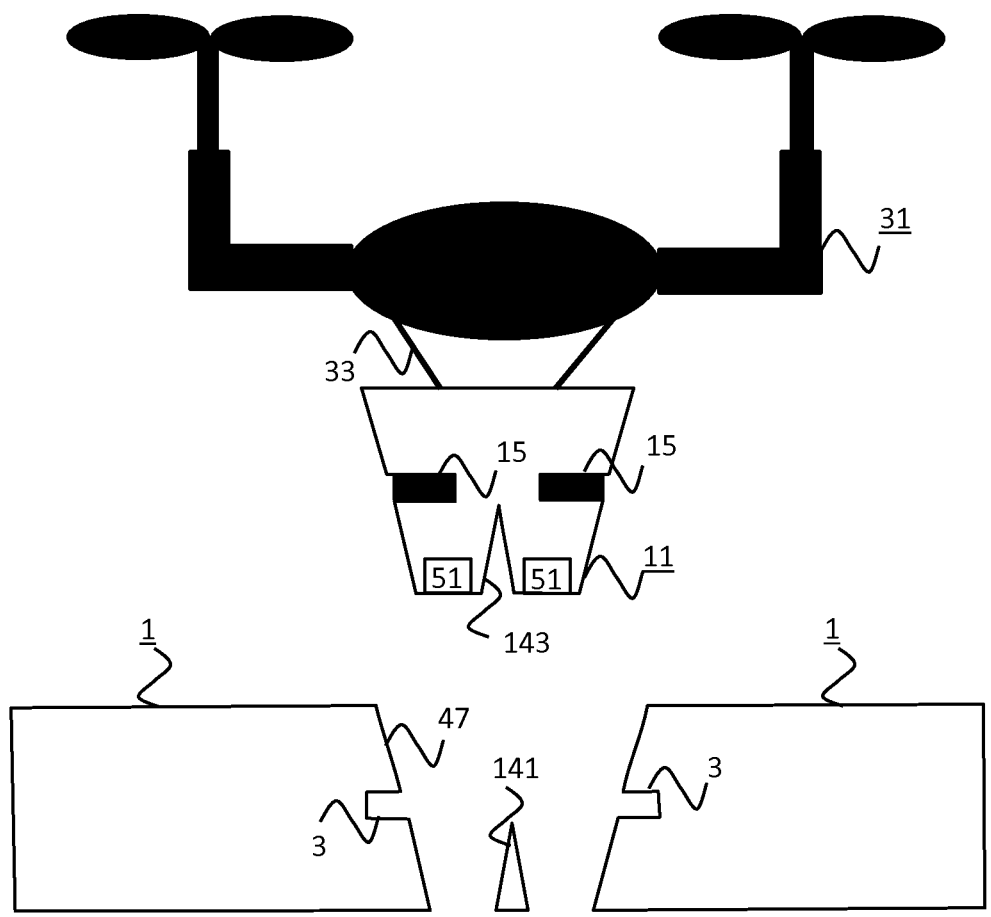
FIG. 19 is a block diagram of a eight embodiment of the base unit and the module of the invention.
Figure 20:
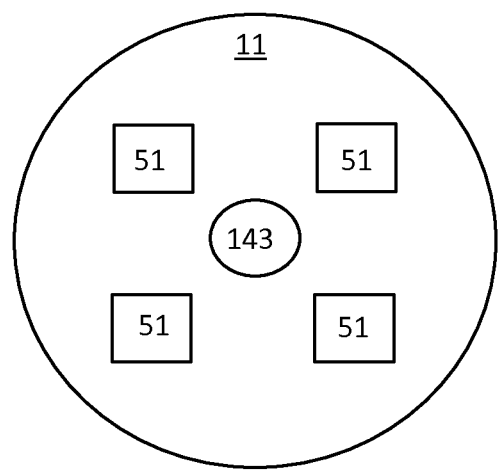
FIG. 20 is a block diagram of the module of FIG. 19 shown from a different perspective.

A further embodiment of the base unit and the module are shown in FIGS. 19 and 20. Compared to FIG. 1, the luminaire 11 of FIG. 19 has a triangular-shaped pin 141 at the bottom of the opening 47 and the light module 11 has a triangular shaped opening 143 at its bottom to function as guiding means. When the light module 11 is lowered into the luminaire 1, the pin 141 will enter the opening 143 and ensure that the light module 11 is automatically centered and correctly aligned with the luminaire 1. FIG. 20 shows the components of the light module 11 with a bottom perspective instead of the side perspective of FIG. 19. Other shapes than a triangular shape may be used. An oval shape will ensure that the light module 11 only fits in the luminaire 1 in two orientations (180 degrees rotated from each other), for example. Alternatively, the pin 141 and the opening 143 may have a shape which allows only one orientation, for example. The shape may depend on the type of the luminaire so that only a matching light unit fits in the luminaire.

Figure 21:
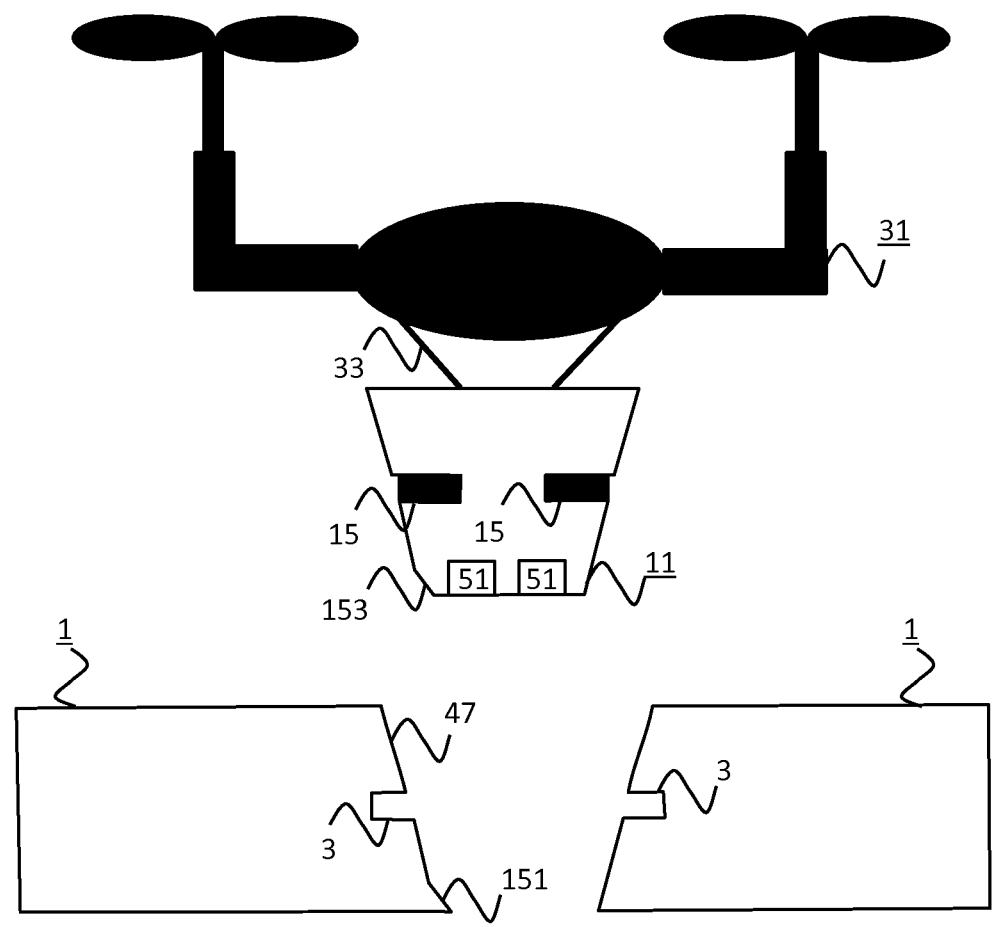
FIG. 21 is a block diagram of a ninth embodiment of the base unit and the module of the invention.

FIG. 21 shows further embodiments of the base unit and the module. Compared to FIG. 1, the luminaire 1 of FIG. 21 has a fixed protrusion 151 at the left bottom of the opening 47. Light module 11 has a similarly shaped dent 153 at its left bottom. This ensures that only a correct/matching light module can be fixated in a luminaire, i.e. a 100 Watt light module may be designed to not fit in a 50 Watt luminaire. For example, a light module without dent or with a dent at a different position will not completely align with the luminaire 1. This is also referred to as mechanical keying. Shapes of the mechanical keys may be more complex than the one shown in FIG. 21. As an alternative method of ensuring that only a correct/matching light module can be fixated in a luminaire, the drone 33 or the light module 11 may need to provide an identifier of the light module 11 to the luminaire 1 via a wired or wireless communication e.g. using an RFID tag identification. The luminaire 1 may be configured to only fixate the light module 11 in the luminaire 1 if the identifier is recognized.

Figure 22:
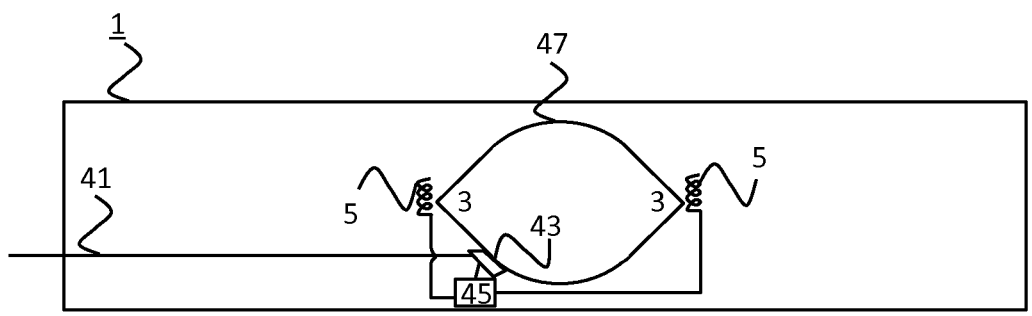
FIG. 22 is a block diagram of a tenth embodiment of the base unit of the invention.

While FIG. 19 showed the use of a pin 141 and a recess 143 in order to guide the light unit 11 towards the correct position and orientation relative to the luminaire 1, FIG. 22 shows an alternative guiding means. In FIG. 22, recesses 3 have been shaped such that when the protrusions 15 of the light module 11 are magnetically attracted towards the recesses 3, as explained with regard to FIG. 1, the light module 11 rotates to allow the protrusions 15 to enter the recesses 3 deeper. This results in the light module 11 obtaining the desired orientation relative to the luminaire 1.

Figure 23:
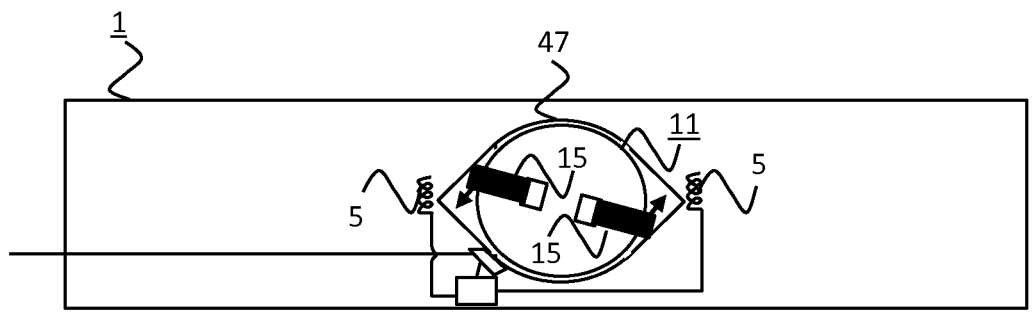
FIGS. 23 and 24 illustrate a light module rotating in the luminaire of FIG. 22.
Figure 24:
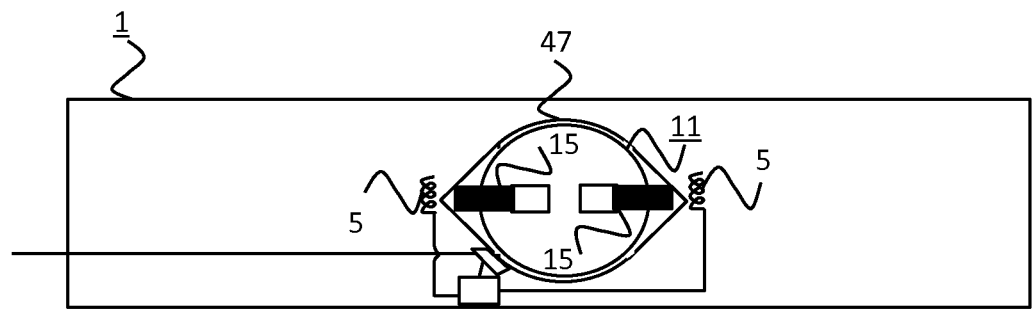

This is illustrated with the help of FIGS. 23 and 24. The protrusions 15 are attracted towards the magnetic field generators 5 when the light module 11 has been inserted into the luminaire 1, even when they are somewhat further away from the magnetic field generators 5. In FIG. 23, the protrusions 15 slightly protrude the light module 11. The protrusions 15 touch the wall of the opening 47, but are still being attracted by the magnetic field generators 5. This causes the luminaire 11 to rotate. During this rotation, the protrusions 45 slide along the wall of the opening 47, protruding more when there is room between the protrusions 15 and the wall of the opening 47. When the protrusions 15 are fully protruded, as shown in FIG. 24, the light module 11 can no longer rotate and the light module 11 is fixed in the luminaire 1.

The first magnetic field generator 5 (e.g. the left one on the FIGS) preferably generates a magnetic field with a polarity opposite to the magnetic field generated by the second magnetic field generator 5 (e.g. the right one on the FIGS). In this case, the first protrusion 15 (e.g. the left one on the FIGS) generates a magnetic field with a polarity opposite to the magnetic field generated by the second protrusion 15 (e.g. the right one on the FIGS).

Figure 25:
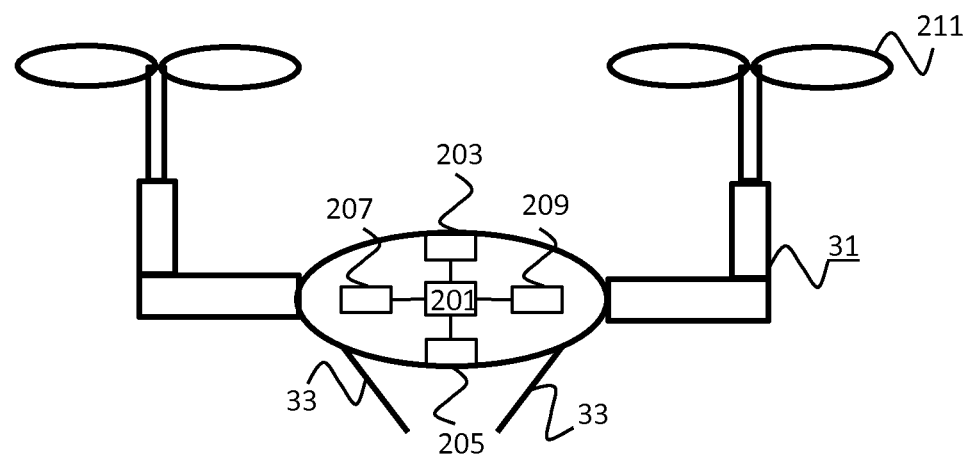
FIG. 25 is a block diagram of an unmanned vehicle of the invention.

FIG. 25 shows a block diagram of an embodiment of an unmanned vehicle or an unmanned aircraft. Drone 31 comprises two blades 211 and two arms 33. The arms 33 may be used for carrying modules, e.g. LED modules, or for landing, for example. Alternatively, the drone 31 may comprise, for example, two sets of arms: one for carrying modules and one for landing. In other embodiments, drone 31 may comprise less or more than two blades and/or less or more than two arms. Drone 31 further comprises a control unit 201 (e.g. an application-specific or general-purpose processor), an upward directed optical sensor 203, a downward directed optical sensor 205, a short range (e.g. ZigBee or RFID) wireless transceiver 207 and a mobile communication network transceiver 209. The drone 31 may further comprise a battery (not shown in FIG. 25).

As previously explained, the arms 33 may be used to dock with a luminaire and/or a light module. The control unit 201 may be configured to use the short range wireless transceiver 207 to transmit a signal to a docking detector of a base unit or a module informing the base unit or the module that the drone 31 has docked and instructing the base unit or the module to release the module from the base unit. The control unit 201 may be configured to use the short range wireless transceiver 207 to receive a signal/message that the module has been fixated in the base unit. The control unit 201 may be configured to use the optical sensor 203 and/or the optical sensor 205 to help dock with the base unit and/or the module, e.g. by finding the docking area of the module or base unit.

Figure 26:
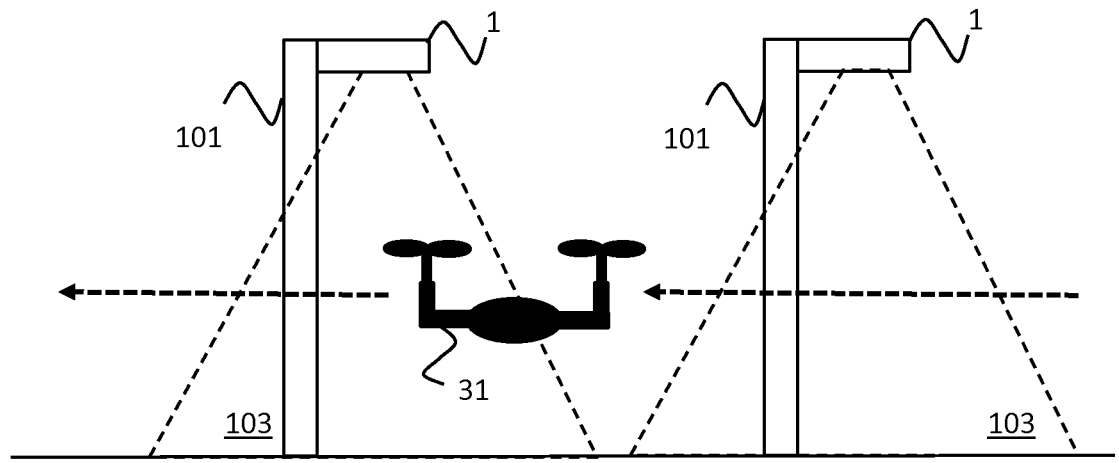
FIG. 26 shows an example of the unmanned vehicle of FIG. 25 flying below lamp posts.

In addition to or instead of being configured to install light modules in and removing modules from base units, the control unit 201 of drone 31 may be configured to sense direct or indirect light emissions from the luminaire 1, see FIG. 26. The drone 31 may fly at a certain height below luminaires 1 attached to lamp posts 101 (e.g. 3 to 4 meters above the ground), as shown in FIG. 26, for example. The drone 31 may be able to find its way from one light pole to the next using GPS or magnetic fields generated by the light poles, for example. The emissions of multiple luminaires may be sensed in succession. When the drone is flying on electricity, it may dock with a luminaire or light module to recharge when the battery goes low. The drone may be configured to correct its route for wind caused by (especially) heavy traffic and bridges and tunnels, for example.

The control unit 201 of drone 31 may be configured to use the optical sensor 203 to sense heat emitted by the luminaire 1. For this purpose, the optical sensor 203 may comprise an IR camera.

Figure 27:
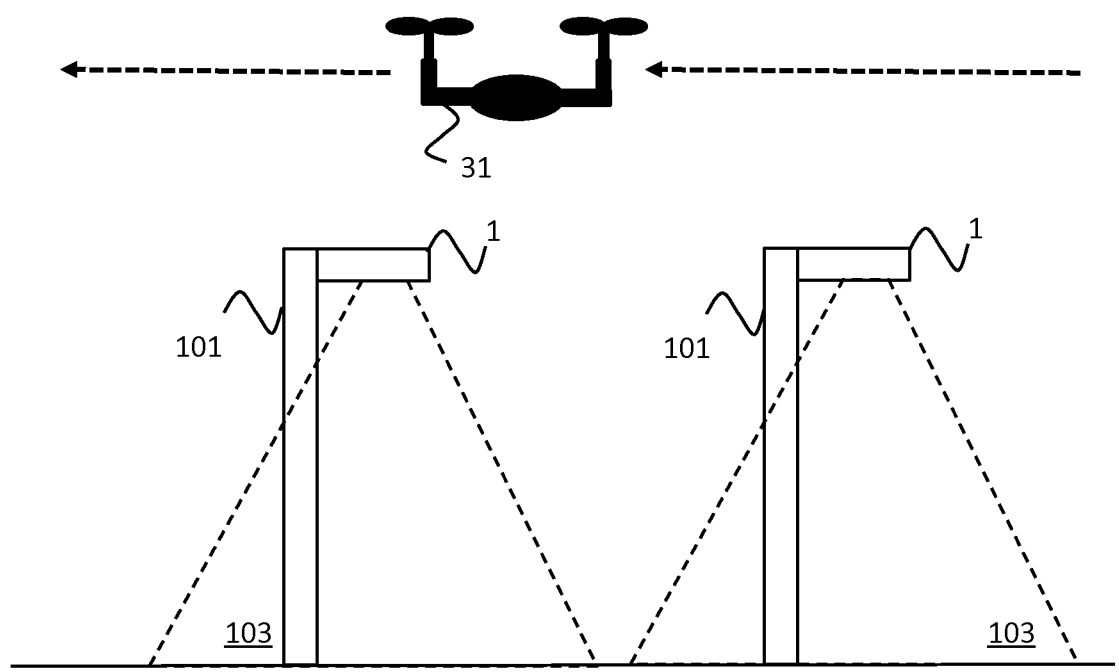
FIG. 27 shows an example of the unmanned vehicle of FIG. 25 flying above lamp posts.

Additionally or alternatively, the control unit 201 of drone 31 may be configured to measure a light distribution of (direct and/or indirect) light emitted by the luminaire 1. The control unit 201 may be configured to use the upward directed optical sensor 203 to perform this measurement from light emissions received directly from the luminaire 1 (i.e. illuminance, e.g. measured in lux). Alternatively or additionally, the control unit 201 may be configured to use the downward directed optical sensor 205 to perform this measurement from light emissions reflected by the ground surface (i.e. luminance, e.g. measured in cd/m2 or nit), e.g. reflected by the road. The drone 31 may fly multiple times at multiple heights and extrapolate the light distribution at street level, which is typically how regulations specify requirements for light distribution. The drone 31 preferably flies when it is dark. When the drone 31 uses its downward directed optical sensor 205, it may fly above the lamp posts 101, as shown in FIG. 27, in order to avoid collisions with other vehicles and to avoid measuring its own shadow in the reflections from the ground surface.

By measuring the optical uniformity under and in between lighting poles, the drone can check if the light distribution is still according legislation. Preferably, the drone measures at e.g. 3-4 m height to avoid interference with cars and people on the street. The height can be determined using the GPS navigation information or a dedicated laser to measure the height. In case the light distribution of the luminaires is known, an easy translation is made between the uniformity measured at altitude x (e.g. 4 m) and the uniformity as experienced by traffic users (e.g. pedestrians and car/bikes). In case the light distribution is not known, measuring the uniformity at several heights can be used to extrapolate the uniformity at street level. The color of the road may be taken into account when normalizing the light distribution.

Regulations typically specify required lumination in cd/m2 as observed by the driver of a car. In particular, (international) regulations typically specify the angle at which a measurement of the lumination is to be performed based on the position of the driver's eyes. In order to perform this measurement, the measurement device needs to hold still for some time. On roads with traffic, this may be an issue if the measurement device is incorporated in a motor vehicle, as holding still may block traffic. By having an unmanned aircraft perform this measurement, this problem is solved. The unmanned aircraft may be configured to hold still for some time and to perform measurements under the same angle as specified in the regulations.

Figure 28:
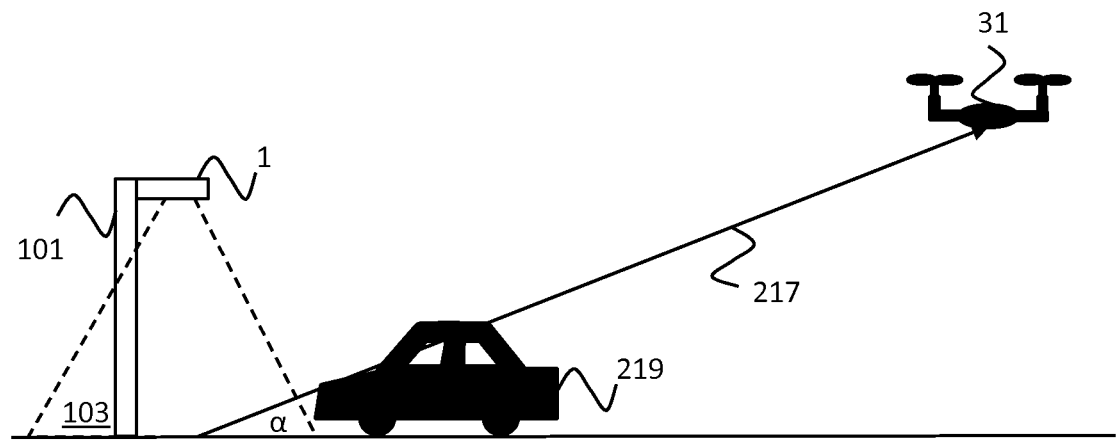
FIG. 28 shows an example of a light distribution measurement.

FIG. 28 shows an angle α between the road and a line 217 from the road below the luminaire 1 through the eyes of the driver of car 219. FIG. 28 illustrates that drone 31 is configured to hold still and measure at the same angle α without blocking other traffic.

The mobile communication network transceiver 209 may be used to transmit sensed light emissions to a control center where they are analyzed. This allows the control center to determine whether the luminaire 1 is working and/or configured properly. The mobile communication transceiver 209 may also be used to determine the position of the drone at the moment of sensing the emissions from the luminaire 1. Alternatively or additionally, the drone 31 may comprise a GPS sensor (not shown) to determine the position of the drone 31.

In the same embodiment or in a different embodiment, the sensed emissions may comprise identifiers communicated using Visible Light Communication (VLC). The drone 31 may be configured to assists in the commissioning procedure, e.g. by checking whether the correct identifiers have been assigned, determining the assigned identifiers and/or assign identifiers to luminaires.

Instead of a drone 31, another type of unmanned vehicle, e.g. a motor vehicle, may be used to sense emissions from the luminaires 1.

Figure 29:
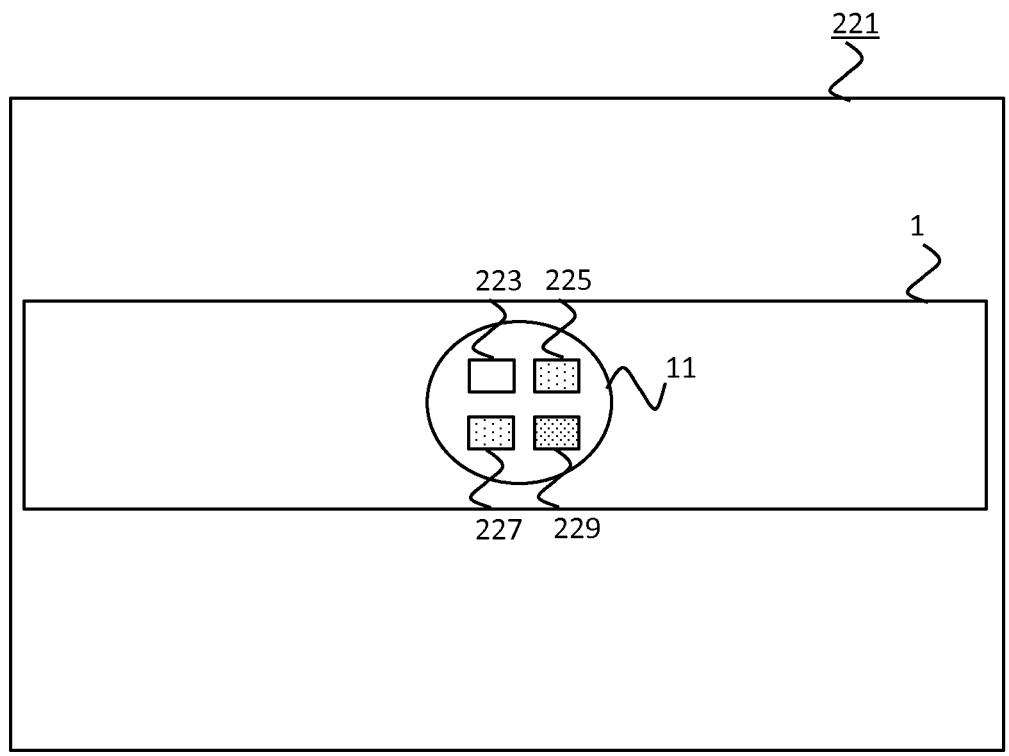
FIG. 29 shows an example of an infrared image of a luminaire.

The control unit 201 of drone 31 may be configured to use an IR camera to sense heat emitted by the luminaire 1. An example of an image captured with the IR camera is shown in FIG. 29. A captured image may be compared with an image associated with the type of luminaire and/or the type of light module captured in the image in order to determine whether the heat emitted by the luminaire matches the heat emissions of a properly working luminaire of the same type or with the same type of light module. In the example image 221 of FIG. 29, the light module 11 comprises four LED chips. All LED chips should have heat emissions similar to those of LED chips 225 and 227. LED chip 223 does not emit heat, indicating that it is no longer working. LED chip 229 emits too much heat, indicating that it does not function properly or that it might stop working in the near future. Similarly, the driver may emit too much heat. When a LED chip is about to blow, it will typically be warm at the soldering contacts. After the light module 11 has been removed from the luminaire 1, it may be examined in more detail in a work shop. For example, a LED chip may emit IR light depending on the failure, which can be determined with a microscope overlaying a normal microscope picture with an IR emission picture or with another type of IR emission analysis.

The control unit 201 of drone 31 may be configured to measure a light distribution of light emitted by the luminaire 1. The measured light distribution may be compared with a desired light distribution profile. Non-uniform light distribution may be caused by a malfunctioning light source, a shifted or tilted light pole or luminaire 1 or a shift of a lens compared to a light source, for example. The uniformity of the measured light distribution may be determined and verified. To obtain measurements that can be compared to a desired light distribution, the position of the unmanned vehicle, e.g. its height, may be used to adjust the measured light distribution.

Figure 30:
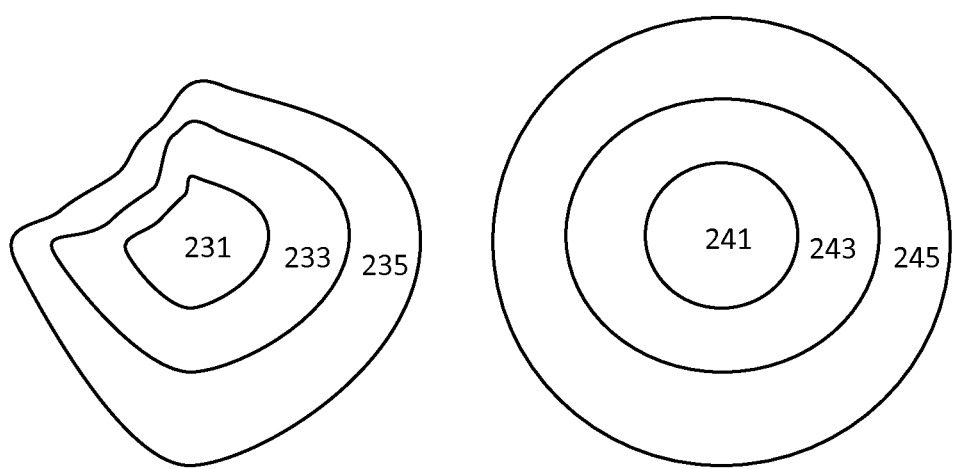
FIG. 30 shows an example of the light distribution observed below the lamp posts of FIG. 27.

Examples of measured light distributions are shown in FIG. 30. FIG. 30 shows three areas 231, 233, 235 on street level relating to a first luminaire and three areas 241, 243, 245 on street level relating a second luminaire. All positions in the same area have similar intensity values. Areas 231 and 241 have the highest intensity. The areas 241, 243, 245 relating to the second luminaire match the desired light distribution. The second luminaire seems to be working properly. The areas 231, 233, 235 do not have a uniform light distribution. This may be the result of one of the light sources, e.g. LED chips, not working properly. To resolve this malfunction, a drone may replace the LED module of the first luminaire, for example. In the examples of FIG. 30, the light beam is symmetric when the LED module is working properly. However, an asymmetric light beam may have a uniform light distribution as well.

The measured light distributions may be compared to each other, with a light distribution of a reference luminaire (e.g. made when the street lighting was designed) or with a desired light distribution (e.g. specified in street lighting regulations) in order to detect non-uniformity.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A base unit, comprising:
    fixation means configured to fixate a module in said base unit, said fixation means being configured to release said module from said base unit upon detecting an unmanned aircraft being docked with said base unit or said module,
    wherein said base unit is a stationary part of an electronic device and said module is a removable part of the same electronic device,
    wherein when said module is fixed in said base unit, said base unit and said module are configured to operate as one electronic device.

2. A base unit as claimed in claim 1, comprising at least one of a protrusion and a recess.

3. A base unit as claimed in claim 2, wherein said protrusion generates a magnetic field or comprises metallic material attracted by a magnetic field.

4. A base unit as claimed in claim 1, wherein said fixation means comprise magnetic field generating means configured to fixate said module in said base unit by attracting a permanent magnet in said module.

5. A base unit as claimed in claim 4, wherein said fixation means comprise further magnetic field generating means configured to cancel a magnetic field generated by said magnetic field generating means.

6. A base unit as claimed in claim 1, further comprising guiding means for guiding said module towards a certain orientation relative to said base unit.

7. A base unit as claimed in claim 1, further comprising alignment detection means for detecting correct alignment of said module with said base unit, wherein said fixation means are configured to lock said module in said base unit in dependence on said module being correctly aligned with said base unit.

8. A module, comprising:
    fixation means configured to fixate said module in a base unit, said fixation means being configured to release said module from said base unit upon detecting an unmanned aircraft being docked with said base unit or said module,
    wherein said base unit is a stationary part of an electronic device and said module is a removable part of the same electronic device,
    wherein when said module is fixed in said base unit, said base unit and said module are configured to operate as one electronic device.

9. A module as claimed in claim 8, comprising at least one of a protrusion and a recess.

10. A module as claimed in claim 9, wherein said protrusion generates a magnetic field or comprises metallic material attracted by a magnetic field.

11. A base unit as claimed in claim 1, wherein said one electronic device is incapable of separating from the base unit under its own power.

12. A module as claimed in claim 8, wherein said one electronic device is incapable of separating from the base unit under its own power.

* * * * *